US012402216B2

(12) United States Patent
Kim et al.

(10) Patent No.: US 12,402,216 B2
(45) Date of Patent: Aug. 26, 2025

(54) ELECTRIC RANGE

(71) Applicant: LG ELECTRONICS INC., Seoul (KR)

(72) Inventors: Seunghak Kim, Seoul (KR); Junghyeon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 877 days.

(21) Appl. No.: 17/521,523

(22) Filed: Nov. 8, 2021

(65) Prior Publication Data

US 2022/0167470 A1 May 26, 2022

(30) Foreign Application Priority Data

Nov. 25, 2020 (KR) ........................ 10-2020-0159559

(51) Int. Cl.
*H05B 6/12* (2006.01)
*H05B 6/36* (2006.01)

(52) U.S. Cl.
CPC ......... *H05B 6/1263* (2013.01); *H05B 6/1254* (2013.01); *H05B 6/365* (2013.01); *H05B 2206/022* (2013.01); *H05B 2213/07* (2013.01)

(58) Field of Classification Search
CPC .......... H05B 2206/022; H05B 2213/07; H05B 6/1254; H05B 6/1263; H05B 6/365
USPC ........ 219/623, 620, 622, 624, 630, 632, 635
See application file for complete search history.

(56) References Cited

U.S. PATENT DOCUMENTS

2007/0278215 A1* 12/2007 Schilling .............. H05B 6/1263 219/622

FOREIGN PATENT DOCUMENTS

| | | | |
|---|---|---|---|
| CN | 102404889 | A | 4/2012 |
| CN | 208025581 | U | 10/2018 |
| CN | 208312454 | U | 1/2019 |
| EP | 2490505 | A1 | 8/2012 |
| EP | 2770801 | B1 | 4/2017 |
| JP | 5919462 | B2 | 5/2016 |
| JP | 6730209 | B2 | 7/2020 |
| KR | 101420875 | B1 | 7/2014 |
| KR | 10-2016-0025173 | A | 3/2016 |
| WO | 2011138715 | A1 | 11/2011 |

OTHER PUBLICATIONS

Translation of P2018147641, "Induction heating cooker", Jul. 29, 2020, by WIPO. (Year: 2020).*
Translation of JP5919462B2, "Induction heating coil", May 18, 2016, by WIPO. (Year: 2016).*
Search Report of European Patent Office in Appl'n No. 21208374.5, dated Mar. 28, 2022.

* cited by examiner

*Primary Examiner* — Quang T Van

(74) *Attorney, Agent, or Firm* — Bryan Cave Leighton Paisner LLP

(57) ABSTRACT

An electric range includes a heating part configured to heat an object based on an electromagnetic interaction. The heating part may include a core frame having a plurality of channels disposed radially on a lower surface thereof and a plurality of ferrite cores mounted onto the channels and disposed under the core frame. The core frame include a plurality of air gaps disposed between the plurality of channels. The plurality of air gaps are disposed radially, and the plurality of air gaps connect a center of the core frame and an edge of the core frame.

19 Claims, 8 Drawing Sheets

ELECTRIC RANGE

CROSS-REFERENCE TO RELATED APPLICATION

This application claims priority to and the benefit of Korean Patent Application No. 10-2020-0159559, filed on Nov. 25, 2020, which is hereby incorporated by reference as if fully set forth.

TECHNICAL FIELD

Disclosed herein is an electric range, and one particular implementation relates to an electric range based on induction heating.

BACKGROUND

Details in the background section do not constitute the related art but are given only as background information concerning the subject matter of the present disclosure.

Various types of cooking appliances are used to heat food at homes or restaurants. For example, a cooking appliance may include a gas range using gas and an electric range using electricity. Also, an electric range may use a resistance heating method and an induction method.

An electrical resistance heating method may generate heat by applying electric current to a metallic resistance wire or a non-metallic heat generation element such as silicon carbide to generate heat, and the generated heat is radiated or conducted to heat an object (e.g., a cooking vessel such as a pot, a frying pan and the like).

An induction heating method may apply high-frequency power to a coil to generate a magnetic field around the coil, and an eddy current produced in the generated magnetic field is used to heat an object made of a metallic material.

Thus, when electric current is supplied to a working coil or a heating coil, heat is generated by induction and may heat an object.

The brackets that support various components of an electric range may have a plate-shaped structure. The plate-shaped structure may become deformed due to the load of the components or an external force. Accordingly, there is a growing need for a structure that can improve rigidity of the brackets.

Additionally, a heating part of an induction heating-based electric range may generate heat as a result of electromagnetic interaction. In some examples, the temperature of the heat generated using an induction heating method may be less than the temperature of the heat generated with a heating part using an electrical resistance heating method.

The heat generated in the heating part may transfer to another component. When the heat generated in the heating part transfers to a printed circuit board and a circuit element that are included in the electric range, the electric range may experience an operational error or damage.

Accordingly, there is a growing need for an electric range having a structure that can suppress or reduce a transfer of heat generated in a heating part to a printed circuit board and a circuit element.

SUMMARY

According to an embodiment of the present disclosure, an electric range having a structure that cools down heat generated in a heating part may be provided.

According to an embodiment of the present disclosure, an electric range having a structure that may suppress or reduce a transfer of hot air generated in a heating part to a printed circuit board may be provided.

According to an embodiment of the present, an electric range having a structure that improves blocking an electromagnetic field and electromagnetic waves may be provided.

An electric range in one embodiment may include a heating part configured to heat an object based on an electromagnetic interaction. The heating part may include a core frame having a plurality of channels disposed radially on a lower or bottom surface thereof. The heating part may also include a plurality of ferrite cores mounted onto the channels and disposed under the core frame.

The core frame may include a plurality of air gaps disposed among or between the plurality of channels. The plurality of air gaps may be disposed radially to communicate or connect a center of the core frame to communicate with an edge of the core frame.

The plurality of air gaps may serve as a passage through which air flows, and may be disposed in a central portion of the core frame, such that air smoothly or evenly flows between a central portion of the heating part and an edge of the heating part through the plurality of air gaps, thereby effectively cooling the heating part.

The core frame may have an open hole in or about a position of the edge thereof, in which the open hole faces the air gap, and the open hole may be formed in a way that adjacent guide lines are spaced apart from one another in a circumferential direction of the core frame.

Similar to the plurality of air gaps, the open hole may serve as a passage through which air flows such that air smoothly or evenly flows between the central portion of the heating part and outside of the heating part through the air gap and the open hole, thereby making effectively cooling the heating part.

An electric range in one embodiment may include a case, a cover plate coupled to an upper end of the case to receive an object to be heated to be placed on an upper or top surface thereof. Further, plurality of heating parts may be disposed under the cover plate and may be configured to heat the object to be heated. Furthermore, a plurality of upper brackets may be disposed under the heating part and may be configured to support the heating part, and a base bracket may be disposed under the upper bracket to facilitate the mounting of a printed circuit board thereon.

Each of the plurality of channels may include a mounting groove onto which a ferrite core may be mounted, and a guide line protruding from a lower or bottom surface of the core frame and forming the mounting groove. At least one of the plurality of air gaps may be formed in a way that the plurality of guide lines are spaced from one another in a circumferential direction in a central portion of the core frame.

At least one of the plurality of guide lines may have a chamfering part configured to reduce a width of a front portion of the guide line in the central portion of the core frame, and the at least one of the plurality of air gaps may be formed in a way or manner that the chamfering parts adjacent to one another are spaced from one another in a circumferential direction of the core frame.

The core frame may have a first inserting hole into which a working coil mounted onto the core frame may be inserted in a portion in which the at least one of the plurality of air gaps is formed.

The core frame may further include a guide rail formed into a spiral or semi-circular shape on an upper surface of the core frame and configured to guide the working coil to allow the working coil to be wound spirally, and a plurality of second coupling parts may be formed to protrude from an outer circumference of the core frame. The plurality of second coupling parts may be disposed radially, and may be coupled to a first coupling part disposed on the upper bracket by a coupling tool.

The core frame may have a mounting hole onto which a temperature sensor may be mounted, in a central portion thereof, and the upper bracket may have a cable inserting hole into which a cable of the temperature sensor may be inserted.

The upper bracket may have a second inserting hole into which the working coil inserted into the core frame may be inserted, and a third inserting hole into which the working coil withdrawn from the core frame may be inserted.

The second inserting hole and the third inserting hole may be formed in a portion of the upper bracket corresponding to an edge portion of the core frame.

The electric range in one embodiment may further include a sensor bracket allowing the temperature sensor to be mounted thereon, and the temperature sensor may be detachably mounted onto the mounting hole.

The cable inserting hole may be formed in or about a portion of the upper bracket corresponding to an edge portion of the core frame.

A surface area of at least one of the air plurality of air gaps on the core frame may be greater than a cross section of the first inserting hole.

An electric range according to embodiments of the present disclosure may facilitate air to flow smoothly or evenly through an air gap and an open hole in a diameter direction below a core frame. Accordingly, heated air may easily or quickly escape out of the core frame while cool air easily or quickly comes into a central portion of the core frame from outside of the core frame. Thus, an additional passage hole for cooling may not needed or may be omitted on a first upper plate of an upper bracket.

Accordingly, since the additional passage hole described above is not formed or needed, a transfer of heat generated in the heating part to a printed circuit board disposed under the first upper plate through the passage hole may be effectively suppressed or reduced.

Further, since the additional passage hole is not formed or needed, an electromagnetic field and electromagnetic waves generated in the heating part entering through the passage hole may be effectively suppressed or reduced at the printed circuit board disposed under an upper bracket, thereby improving EMC and EMI of the electric range.

Furthermore, since a working coil is disposed in the plurality of air gaps and the open hole, a second inserting hole may be disposed at an edge of the core frame. Accordingly, less heat may transfer or flow from the heating part to the printed circuit board through the second inserting hole at the edge of the core frame, compared to an example in which the second inserting hole is disposed in the central portion of the core frame.

Specific effects are described along with the above-described effects in the section of Detailed Description.

Aspects, features, and advantages of the present disclosure are not limited to those described above. It is understood that other aspects, features, and advantages not mentioned above can be clearly understood from the following description and can be more clearly understood from the embodiments set forth herein. Additionally, it is understood that various aspects, features, and advantages described herein can be realized via means and combinations thereof that are described in the appended claims.

BRIEF DESCRIPTION OF DRAWINGS

The accompanying drawings constitute a part of the specification, illustrate one or more embodiments in the disclosure, and together with the specification, explain the disclosure.

DETAILED DESCRIPTION

Figure 1:
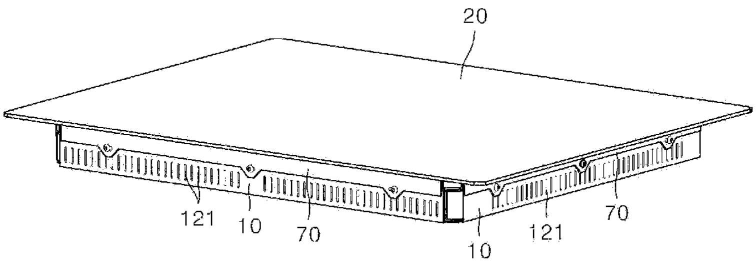
FIG. 1 is a perspective view showing an electric range according to an embodiment of the present disclosure.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The terms "first", "second" and the like are used herein only to distinguish one component from another component. Thus, the components should not be limited by the terms. Certainly, a first component can be a second component unless stated to the contrary.

Throughout the disclosure, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

Throughout the disclosure, "a vertical direction" refers to a vertical direction of an electric range when the electric range is disposed for normal use. "A horizontal direction" refers to a direction orthogonal to the vertical direction, and a forward and rearward direction refers to a direction orthogonal to both the vertical direction and the horizontal direction. "Bilateral direction" or "a lateral direction" has the same meaning as the horizontal direction, and these terms may be used interchangeably herein.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Figure 2:
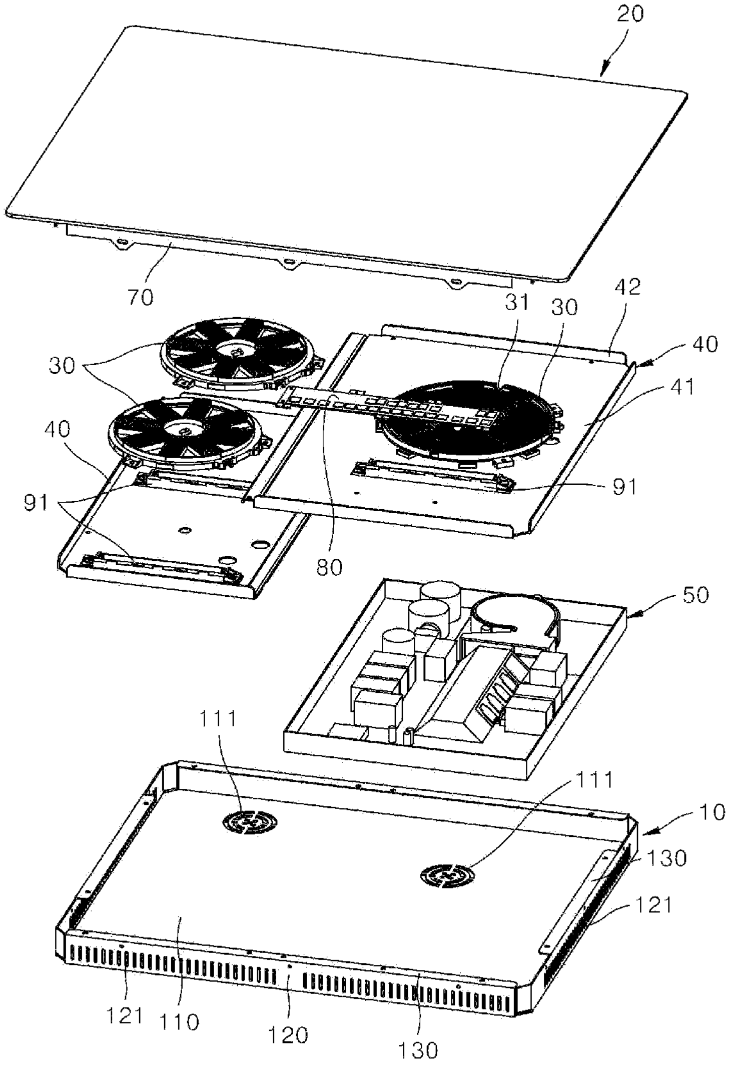
FIG. 2 is an exploded perspective view showing the electric range according to an embodiment of the present disclosure.

FIG. 1 is a perspective view showing an electric range according to an embodiment of the present disclosure. FIG. 2 is an exploded perspective view showing the electric range according to an embodiment of the present disclosure.

The electric range according to an embodiment of the present disclosure may heat an object based on induction heating. In this example, the object may be a cooking vessel containing a metallic material such as stainless steel, iron and the like.

In one example, induction heating process, high-frequency power may be supplied to a working coil 31 to generate a magnetic field around the working coil 31, and an object to be heated made of a metallic material may be heated using an eddy current generated by the generated magnetic field.

That is, a heating part 30 having a structure with a working coil 31 adjacent to a ferrite core 330 may supply a high-frequency power to the working coil 31 to generate a magnetic field around the working coil 31, and when an object to be heated is placed in an area of the generated magnetic field, an eddy current caused by the magnetic field may flow through the object to cause Joule heating, thereby heating the object. Accordingly, a cooking vessel may be the object to be heated by induction, and a food item contained in the cooking vessel may be heated and cooked.

According to an embodiment of the present disclosure, an electric range may include a case 10, a cover plate 20, a heating part 30, an upper bracket 40, and a base bracket 50.

The case 10 may protect the electric range and the components constituting the electric range. For example, the case 10 may be made of aluminum, but is not limited thereto.

The case 10 may be thermally insulated to suppress release of heat generated by the working coil 31 to outside.

Various components such as the heating part 30, the working coil 31, the upper bracket 40, a control board 80 and the like constituting the electric range may be stored or disposed in the case 10. The case 10 may include an opening, and the opening may be closed by the cover plate 20. The case 10 may have a cubical shape (or any other suitable shape), which may be formed as a result of processing plate-shaped materials.

The case 10 may include a first casing 110, a second casing 120 and a third casing 130.

The first casing 110 may be configured to define a bottom surface of the case 10. The first casing 110 may support the various components described above in accordance with embodiments of the electric range.

The first casing 110 may include at least one of vent holes 111 through which air may flow or communicate, and the vent holes 111 may help cool a printed circuit board 51 and the circuit element components mounted onto the printed circuit board 51 disposed on the first casing 110.

The second casing 120 may bend from the first casing 110 to form or define lateral surfaces of the case 10. The second casing 120 may bend from edges of the first casing 110 in an up-down or vertical direction to define the lateral or side walls of the electric range. The second casing 120 may surround the lateral or side walls of the base bracket 50.

The second casing 120 may be disposed on each side of the first casing 110 to form or define a substantially rectangular shape. The second casing 120 may improve or reinforce the rigidity of the case 10 entirely.

That is, the second casing 120 bent from the first casing 110 may reduce or suppress the plate-shaped first casing 100 from bending (or deformed) or being damaged the by weight of the built-in or internal components thereof or an external force.

The second casing 120 may further include a plurality of exhaust holes 121 formed into or defining slits. The plurality of exhaust holes 121 may be configured to communicate air from inside of the case 10 to outside of the case 10. Accordingly, the exhaust holes 121 may cool the components stored or disposed in the case 10.

The third casing 130 may bend from the second casing 120, and may support the upper bracket 40. The third casing 130 may be disposed on each side of the first casing 110.

A first upper plate 41 forming a bottom surface of the upper bracket 40 may be mounted onto an upper or top surface of the third casing 130, and the first upper plate 41 and the third casing 130 may be coupled to each other by a coupling tool such as a bolt and the like.

The cover plate 20 may be coupled to an upper or top end or portion of the case 10, and an object to be heated may be disposed on the upper or top surface of the cover plate 20. The cover plate 20 may close the open upper or top portion of the case 10 and may protect the components stored or disposed in the case 10.

An object to be heated may be placed on the upper or top surface of the cover plate 20, and a magnetic field generated in the heating part 30 may pass through the cover plate 20 and reach the object to be heated. The cover plate 20 may be made of a material containing ceramics, for example, but is not limited thereto.

An input interface may be disposed on the upper or top surface of the cover plate 20, and the input interface may receive an input from a user. The input interface may be disposed in an area of the upper or top surface of the cover plate 20, and may display an image. It is understood that the input interface is not limited to any specific location.

The input interface may receive a touch input from the user, and the electric range of the present disclosure may operate based on the received touch input.

For example, the input interface may be a module for inputting a heating intensity or a heating period and the like desired by the user, and may be implemented as a physical button or a touch panel and the like.

For example, the input interface may be a thin film transistor liquid crystal display (TFT LCD), but is not limited thereto.

The control board 80 may be disposed under the cover plate 20, and the control board 80 may be used to input or provide an instruction to operate the electric range of the present disclosure. The control board 80 may include or be provided with a plurality of key switches, and the user may input an instruction or command to the control board 80 through the key switches to controlling the operation of the electric range of the present disclosure.

In one embodiment of the electric range, an upper surface of the control board 80 may contact or be adjacent to the lower or bottom surface of the cover plate 20. In this embodiment, the control board 80 may be disposed at or about a position corresponding to the position of the input interface.

The control board 80 and the input interface may be connected to each other to facilitate electrostatic touch input. Thus, when a user inputs a control instruction on the input interface, the control instruction may be input or transmitted to the control board 80.

Additionally, a display may be disposed at or about an area on the upper or top surface of the cover plate 20, and the display may display a driving state of the electric range. It is understood that the display is not limited to any specific location.

A light display area may be formed on the upper or top surface of the cover plate 20. A light source unit 91 may be disposed under the cover plate 20, and the light rays emitted from the light source unit 91 may be delivered to the user through the light display area. In this case, the light display area and the light source unit 91 may be disposed in positions that correspond with each other. When a plurality of light source units 91 is provided, the same number of light display areas as the number of light source units 91 may be provided on the upper or top surface of the cover plate 20.

The electric range in an embodiment of the present disclosure may further include a cover bracket 70 for supporting the cover plate 20. The cover bracket 70 is described hereinafter with reference to FIGS. 2, 4, and 5.

The cover bracket 70 may be disposed outside the upper bracket 40 and the case 10. The cover bracket 70 may be coupled to the case 10 and may support the cover plate 20. For example, the cover bracket 70 may be coupled to the case 10 by a coupling tool such as a bolt and the like.

A plurality of cover brackets 70 may be provided, and each of the plurality of cover brackets 70 may be disposed in a portion corresponding to each side of the cover plate 20 formed into a rectangular shape. Accordingly, a total of four cover brackets 70 may be provided such that each of the plurality of cover brackets 70 may be disposed on each side of the rectangle-shaped cover plate 20.

The cover bracket 70 may include a first cover plate 710 and a second cover plate 720. The first cover plate 710 may be disposed to face the second casing 120 and may be coupled to the second casing 120. The second cover plate 720 may be bent from the first cover plate 710 and may support the cover plate 20.

The cover plate 20 may be mounted onto an upper or top surface of the second cover plate 720, and the second cover plate 720 and the cover plate 20 may be coupled to each other by an adhesive, for example. However, the method for coupling the second cover plate 720 and the cover plate 20 may not be limited.

A plurality of heating parts 30 may be provided, disposed under the cover plate 20 to heat the object to be heated. In the embodiment, the plurality of heating parts 30 may be provided to operate based on an induction heating method.

In another embodiment, some of the plurality of heating parts 30 may be based on induction heating, and the remaining heating parts may be provided as a highlight heating apparatus based on electrical resistance heating. That is, the electric range in one embodiment of the present disclosure may be provided as a hybrid range.

Hereunder, an electric range in accordance with an embodiment of the present disclosure is described with all of the plurality of heating parts 30 being based on induction heating is described.

The heating parts 30 may be mounted onto the upper bracket 40, and in one embodiment, a total of three heating parts 30 may be provided. It is understood that the number of the heating parts 30 may not be limited. When a plurality of heating parts 30 is provided, a plurality of upper brackets 40 supporting the heating parts 30 may be provided.

The heating parts 30 may be provided with a core frame 320, a working coil 31 may be spirally wound around an upper surface of the core frame 320, and a ferrite core 330 may be mounted onto a lower or bottom surface of the core frame 320. Accordingly, when the working coil 31 is supplied with high-frequency power, a magnetic field may be formed around the ferrite core 330, and an eddy current may be formed in the object to be heated due to the magnetic field.

The heating parts 30 are described below with reference to the following drawings.

Figure 3:
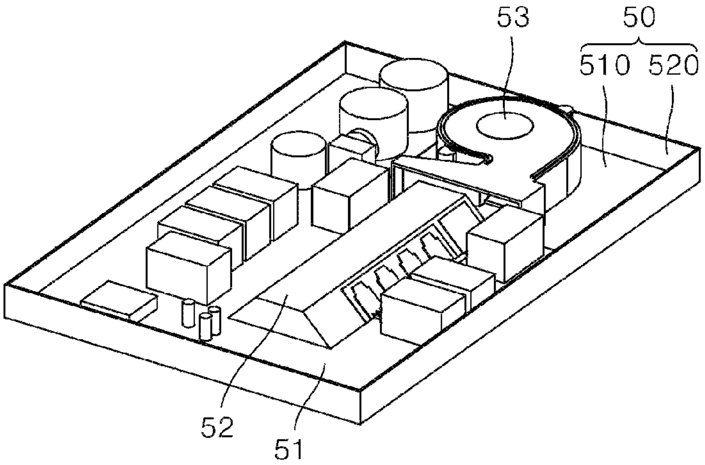
FIG. 3 is a perspective view showing a base bracket and components mounted onto the base bracket according to an embodiment of the present disclosure.
Figure 4:
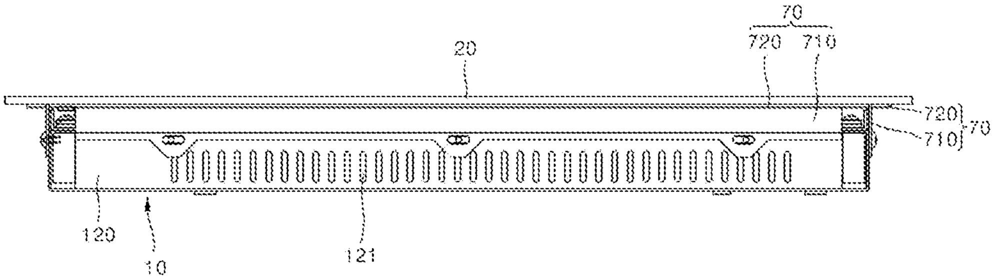
FIG. 4 is a front view showing the electric range according to an embodiment of the present disclosure.

FIG. 3 is a perspective view showing a base bracket 50 and components mounted onto the base bracket 50 in one embodiment. FIG. 4 is a front view showing the electric range in one embodiment.

Figure 5:
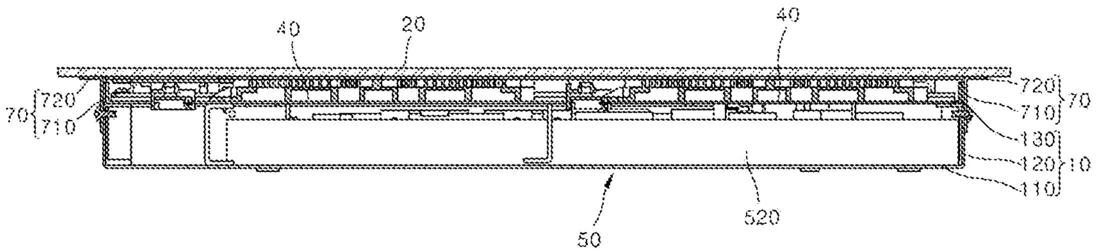
FIG. 5 is a cross-sectional view of the electric range according to the embodiment shown FIG. 4.
Figure 6:
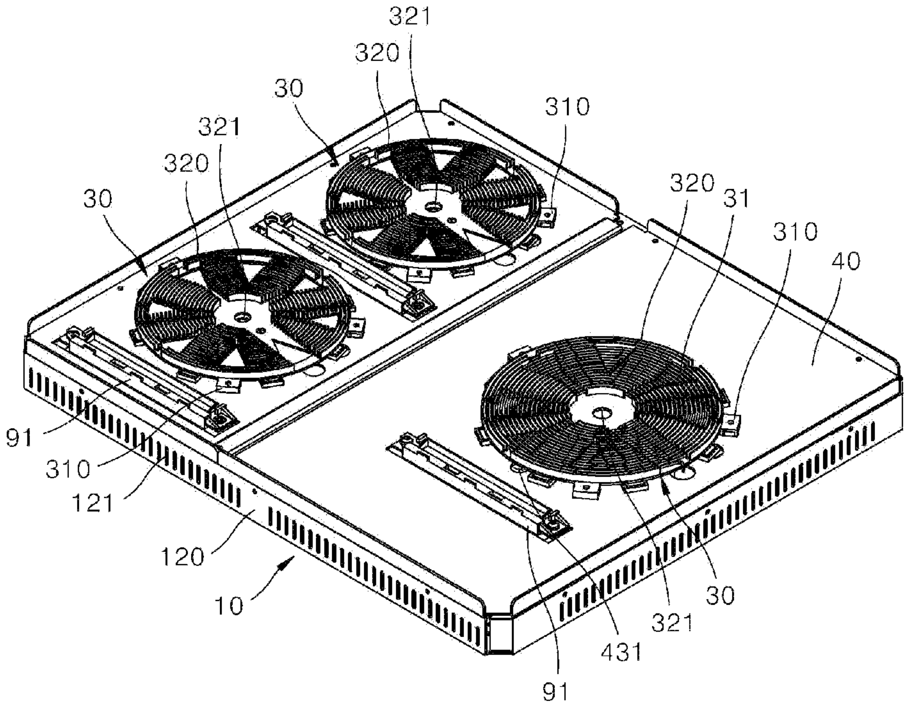
FIG. 6 is a perspective view showing the electric range according to the embodiment in FIG. 1.

FIG. 5 is a cross-sectional view of FIG. 4. FIG. 6 is a perspective view showing the electric range in FIG. 1 without some components.

The upper bracket 40 may be disposed under the heating part 30 and support the heating part 30. In one embodiment, a plurality of upper brackets 40 may be provided. The upper brackets 40 may be made of aluminum, for example, but is not limited thereto.

The upper bracket 40 may include a first upper plate 41 and a second upper plate 42. The first upper plate 41 may form a bottom surface of the upper bracket 40, and the heating part 30 may be mounted onto the first upper plate 41.

The first upper plate 41 may be provided to cover a printed circuit board 51 that may be disposed under the first upper plate 41 in the vertical or up-down direction. When a plurality of upper brackets 40 is provided, a single first upper plate 41, or a plurality of first upper plates 41 that may be coupled to one another may cover the printed circuit board 51 depending on the surface area of the printed circuit board 51.

With the structure, the first upper plate 41 may block an electromagnetic field and electronic magnetic waves, generated from the heating part 30, from reaching the printed circuit board 51 and other elements mounted onto the printed circuit board 51.

That is, the upper bracket 40 may improve the performance of electromagnetic compatibility (EMC) and electromagnetic interference (EMI) of the printed circuit board 51.

One or more second upper plates 42 may be formed by bending the first upper plate 41 in the vertical or up-down direction of the electric range. The second upper plates 42 may bend from edges of the first upper plate 41 in the vertical or up-down direction.

The second upper plates 42 may be disposed on or about each side of the first upper plate 41 to form a substantially rectangular shape. When a plurality of upper brackets 40 is provided, the second upper plates 42 may be formed on each side of the first upper plate 41 except on or about mutually adjacent sides of the upper brackets 40.

The second upper plate 42 improve the rigidity of the upper bracket 40. That is, the second upper plates 42 bent from the first upper plate 41 reduce the possibility of bending or damaging the plate-shaped first upper plate 41 due to the weight of the built-in components including the heating parts 30 or an external force.

A light source unit 91 may be disposed on the upper bracket 40. For example, the light source unit 91 may be disposed on the printed circuit board 51 disposed under the upper bracket 40, and the upper bracket 40 may have an opening disposed at or about the position corresponding to a position of the light source unit 91. In another embodiment, the light source unit 91 may be disposed on the bracket, and electrically connect to the printed circuit board 51 under the upper bracket 40.

As described above, a light display area may be formed in a portion of the cover plate 20, corresponding to the light source unit 91. It is understood that the position of the light display area is not specifically limited.

The light source unit 91 may be provided in a way or manner such that a plurality of LEDs may be aligned in a row, for example. The light source unit 91 may light up when the heating parts 30 operate to inform the user whether the heating parts 30 is in operation. Alternatively, at the light source unit 91, various lit-up shapes, colors and the like of the plurality of LEDs may change to inform the user of the operation state of the electric range.

The number of the light source units 91 may be determined based on the number of the heating parts 30. As shown in FIG. 6, three light source units 91 may be provided based on the three heating parts 30. However, the number of the light source units 91 is not limited.

A base bracket 50 may be disposed under the upper bracket 40, and may include a bottom plate 510 and a lateral plate 520. The printed circuit board 51 may be mounted onto the base bracket 50. The bottom plate 510 may form a bottom surface of the base bracket 50, and the printed circuit board 51 may be mounted onto an upper or top surface of the base bracket 50 or the bottom plate 510.

The lateral plate 520 may be formed by bending from the bottom plate 510 in the vertical or up-down direction of the electric range. The lateral plate 520 may bend at or around the edges of the bottom plate 510 in the vertical or up-down direction.

The lateral plate 520 may be disposed on each side of the bottom plate 510 formed to form a substantially rectangular shape. In one example, a plurality of upper brackets 40 may be provided, and the lateral plate 520 may be formed on each side of the bottom plate 510 except for the adjacent sides of the upper brackets 40.

The lateral plate 520 improves the rigidity of the base bracket 50. That is, the lateral plate 520 bent from the bottom plate 510 may reduce the possibility of a bending or damaging the plate-shaped bottom plate 510 due to the weight of the built-in components such as the printed circuit board 51 and the like or an external force.

The printed circuit board 51 may include a controller, receive power from an external power source, and may be configured to communicate with an external device in a wired or wireless manner.

The printed circuit board 51 may electrically connect to the control board 80 to receive instructions input by a user on the control board 80. The printed circuit board 51 may electrically connect to the light source unit 91 and the working coil 31 to control the operation of the light source unit 91 and the working coil 31.

Referring to FIG. 3, a heat sink 52, active elements including an air blowing fan 53, and passive elements may be mounted onto the printed circuit board 51, and an electric circuit may be formed on the printed circuit board 51.

The heat sink 52 may cool down the heat inside the case 10 to protect the components stored or disposed in the case 10. The heat sink 52 may be mounted onto the printed circuit board 51, and cool down the heat generated on the printed circuit board. Further, the heat sink 52 may cool down the heat that is generated by an electromagnetic interaction as a result of the operation of the heating part 30.

For example, the heat sink 52 may have a plurality of cooling fins, and may include an air guide that may be configured to cover the cooling fins and to guide the flow of air to the cooling fins.

The air blowing fan 53 may be mounted onto the printed circuit board 51. In this example, as illustrated in FIG. 3, a guide wall for guiding the flow of air may be formed at or about an air outlet of the air blowing fan 53 in a direction in which the heat sink 52 may be disposed such that the air, forced to flow by the air blowing fan 53, flows to the heat sink 52.

As a result of the operation of the air blowing fan 53, air inside the case 10 may flow to the heat sink 52, and the inside of the case 10 may be cooled by the heat sink 52.

Figure 7:
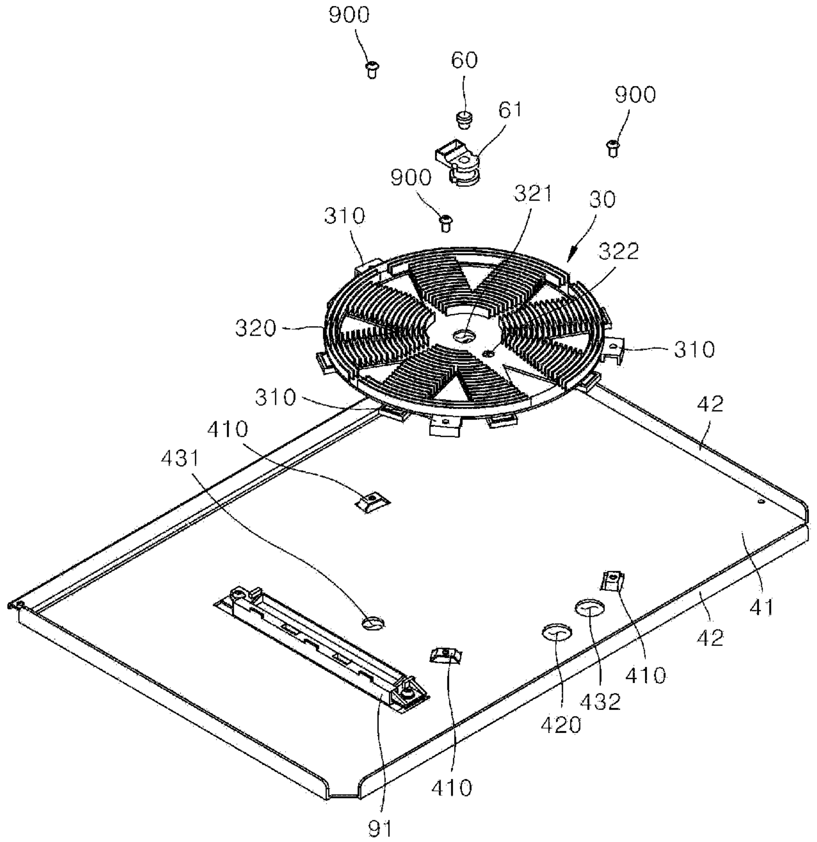
FIG. 7 is an exploded perspective view showing some of the components of the electric range according to the embodiment shown in FIG. 6.
Figure 8:
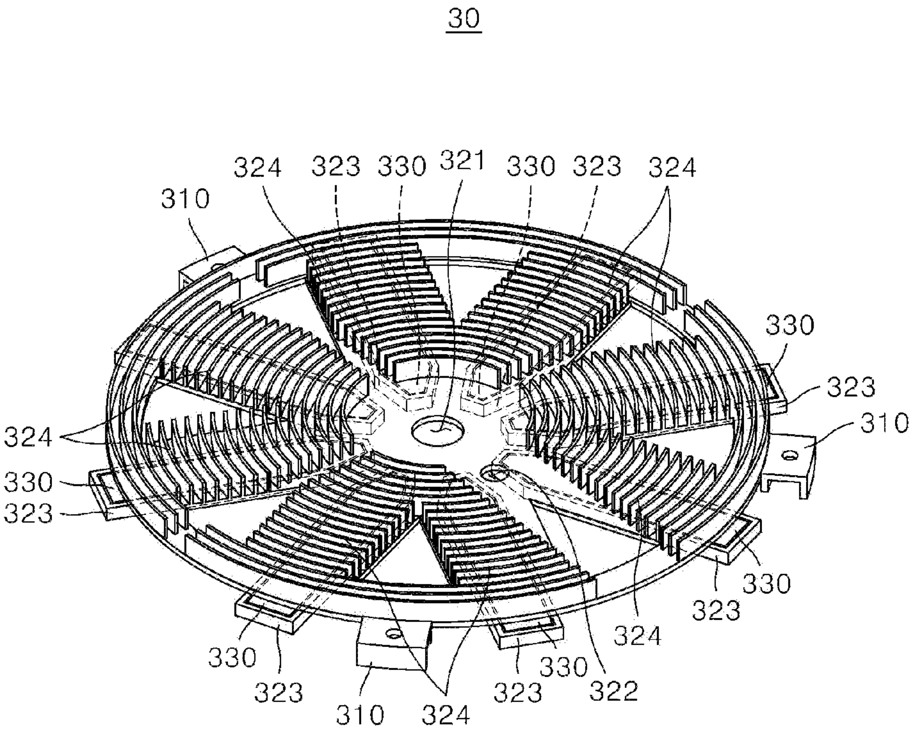
FIG. 8 is a perspective view showing an example heating part according to an embodiment of the present disclosure.

FIG. 7 is an exploded perspective view showing some of the components of the electric range in accordance with an embodiment, shown in FIG. 6. FIG. 8 is a perspective view showing a heating part 30 in one embodiment. In FIGS. 7 and 8, a working coil 31 is omitted for clarity of description and illustrations.

In one embodiment, the heating part 30 may be mounted onto the upper bracket 40 with one or more coupling parts may be formed at the corresponding portions of the heating part 30 and the upper bracket 40 to couple the heating part 30 and the upper bracket 40 accordingly.

The upper bracket 40 may be provided with one or more first coupling parts 410 protruding from and coupled to the heating part 30. The heating part 30 may be provided with one or more second coupling parts 310 corresponding to the first coupling parts 410.

A plurality of second coupling parts 310 may protrude from the outer circumference of the core frame 320, and may be disposed radially and may be coupled to the first coupling part 410 disposed on the upper bracket 40 by a coupling tool.

Each of the second coupling parts 310 may be disposed radially on an edge of the heating part 30 and may be spaced apart from one another in a circumferential direction. The same number of first coupling parts 410 as the number of second coupling parts 310 may be provided, and the second coupling parts 310 may be formed in positions corresponding to positions of the first coupling parts 410 on the upper bracket 40.

In one example, the first coupling part 410 and the second coupling part 310 may be fastened by a screw bolt 900, and may be coupled to each other.

The electric range in one embodiment may further include a temperature sensor 60 disposed at or about a central portion of the core frame 320. The core frame 320 may have a mounting hole 321 onto which the temperature sensor 60 may be mounted, in the central portion thereof.

The temperature sensor 60 may be electrically connected to the printed circuit board 51 provided under the upper bracket 40 by a cable. Accordingly, the cable connecting the temperature sensor 60 and the printed circuit board 51 may be installed in a way or manner that the cable passes through the upper bracket 40. Accordingly, the upper bracket 40 may have a cable inserting hole 420 into which the cable of the temperature sensor 60 may be inserted.

In one embodiment, the electric range may further include a sensor bracket 61 for the temperature sensor 60 to be mounted onto the core frame 320. The temperature sensor 60 may be mounted onto the sensor bracket 61, and the sensor bracket 61 may be detachably mounted onto the mounting hole 321.

The temperature sensor 60 may measure a temperature of the heating part 30 during the operation of the electric range of the present disclosure. The heating part 30 provided based on an induction heating method may not generate high-temperature heat on its own. However, the heating part 30 may generate heat due to the electromagnetic interaction, even with low temperature heat.

The heat generated by the heating part 30 may adversely affect not only the heating part 30 but also the printed circuit board 51 disposed under the heating part 30 and various types of components included in the printed circuit board 51. To reduce or prevent the effects of the heat, the temperature of the heating part 30 may be measured, and when the measured temperature exceeds a predetermined value, appropriate measures may be taken accordingly in the electric range.

For example, the controller may receive information on the temperature of the heating part 30 measured by the temperature sensor 60, and when the temperature of the heating part 30 exceeds the predetermined value, the controller may stop the operation of the electric range or control the air blowing fan 53 to increase the cooling capacity.

The core frame 320 may have a first inserting hole 322 into which the working coil 31 mounted onto the core frame 320 may be inserted. The first inserting hole 322 may be formed at or about a position spaced in a diameter or radial direction from the mounting hole 321 at or about the central portion of the core frame 320.

The working coil 31 may pass through the first inserting hole 322, may be inserted into an upper surface of the central portion of the core frame 320, may be wound spirally around a guide rail 324 disposed on the upper or top surface of the core frame 320, and then may be withdrawn outward from an edge portion of the core frame 320.

The working coil 31 may be electrically connected to the printed circuit board 51 disposed under the upper bracket 40. Accordingly, the upper bracket 40 may have an inserting hole into which the working coil 31 may be inserted through the inserting hole.

The inserting hole may include a second inserting hole 431 and a third inserting hole 432, and the second inserting hole 431 and the third inserting hole 432 may be formed on the upper bracket 40. The working coil 31 inserted into the core frame 320 may be inserted into the second inserting hole 431. The working coil 31 withdrawn from the core frame 320 may be inserted into the third inserting hole 432.

For example, for the working coil 31 to be disposed readily, the third inserting hole 432 may be provided at or near the edge of the core frame 320.

The working coil 31 may be inserted into the central portion of the core frame 320, may be provided or move to the edge of the core frame 320 while being wound around the guide rail 324, and may then be withdrawn outward from the edge of the core frame 320.

For the working coil 31 to be easily disposed in the electric range, the third inserting hole 432 may be formed in a portion of the upper or top bracket 40, corresponding to the edge portion of the core frame 320.

The working coil 31 may pass through the second inserting hole 431 of the upper bracket 40 from the printed circuit board 51, may pass through the first inserting hole 322 formed on the core frame 320, and may be inserted into the upper or top surface of the central portion of the core frame 320.

The working coil 31 may move to the edge of the core frame 320 while being wound spirally around the guide rail 324 disposed on the upper surface of the core frame 320. Thereafter, the working coil 31 may be withdrawn out of the core frame 320.

The working coil 31 withdrawn out of the core frame 320 may pass through the third inserting hole 432 formed on the upper bracket 40, and may connect to the printed circuit board 51 again.

The heating part 30 is further described with reference to FIG. 8 hereinafter.

The heating part 30 may include a working coil 31, a core frame 320, and a ferrite core 330. In FIG. 8, the working coil 31 is omitted for clarity of description and illustration of the structure of the heating part 30. The heating part 30 around which the working coil 31 is wound is illustrated in the other drawings. Accordingly, the subject matter of the present disclosure can be understood without difficulty by a person having ordinary skill in the art.

The working coil 31 may be supplied with high-frequency power to generate a magnetic field. The working coil 31 may be made of a Litz wire exhibiting high durability, for example, but is not limited thereto.

The ferrite core 330 may be mounted onto the lower or bottom surface of the core frame 320, and the working coil 31 may be wound around the upper or top surface of the core frame 320. A plurality of channels 323 may be provided radially on the lower or bottom surface of the core frame 320. The ferrite core 330 may be mounted onto or in the channels 323. The same number of the channels 323 as the number of the ferrite cores 330 may be provided.

Each of the plurality of channels 323 may include a mounting groove **323*a* onto which the ferrite core 330 may be mounted, and a guide line 323*b* protruding from the lower or bottom surface of the core frame 320 to form or define the mounting groove 323*a***.

As illustrated in FIG. 8, a ferrite core 330 may protrude further outward than the edge of the core frame 320 in a diameter or radial direction of the core frame 320. Accordingly, the guide line **323*b* may only be formed at or about the edge portion, without the mounting groove 323*a***.

The plurality of channels 323 may be formed such that the plurality of ferrite cores 330 may be radially spaced apart by a predetermined distance from one another in the circumferential direction of the core frame 320, as shown in FIG. 8.

As illustrated in FIG. 8, the first inserting hole 322 into which the working coil 31 is inserted may be formed between two adjacent ferrite cores 330, at or about the central portion of the core frame 320. Accordingly, to prevent interference between the ferrite cores 330 and the first inserting hole 322, the channel 323 disposed in a position adjacent to the first inserting hole 322 may be spaced apart in the circumferential direction by a distance greater than a diameter of the first inserting hole 322, in the central portion of the core frame 320, for example.

The guide rails 324 around which the working coil 31 is wound may be formed on an upper or top surface of the ferrite core 330. The guide rails 324 may protrude from the upper or top surface of the core frame 320 and may be formed into a spiral or semi-circular shape such that the working coil 31 mounted onto the core frame 320 may be guided by the guide rail 324 and wound spirally.

A plurality of guide rails 324 may be provided in the diameter or radial direction of the core frame 320. The working coil 31 may be mounted onto the grooves formed among the plurality of guide rails 324 and may be wound around the guide rails 324.

An adhesive may be applied to the guide rails 324 and the grooves among or between the guide rails 324, to reliably fix or attach the working coil 31 to the upper or top surface of the core frame 320, and the working coil 31 may adhere to the upper or top surface of the core frame 320.

For example, to electrically insulate the working coil 31, the adhesive may be made of an insulating material.

A space may be formed in or about a portion of the lower or bottom surface of the core frame 320, in which the ferrite core 330 is not installed. Accordingly, the guide rails 324, as illustrated in FIG. 8, may be formed discontinuously in the circumferential direction of the core frame 320.

However, the guide rails 324 may be formed into a spiral or semi-circular shape from the central portion of the core frame toward the edge thereof, and the working coil 31 may be wound around the guide rails 324 to be disposed in a spiral or semi-circular shape from the central portion of the core frame toward the edge thereof.

That is, the working coil 31 may be inserted into the upper or top surface of the core frame 320 by passing through the first inserting hole 322, and may be wound around the guide rails 324 and to be formed into a spiral or semi-circular shape, and withdrawn outward from the edge of the core frame 320.

A plurality of ferrite cores 330 may be provided and mounted onto the channel 323, and may be disposed under the core frame 320. Each of the ferrite cores 330 may be coupled to the corresponding mounting groove **323*a* of the channels 323 by an adhesive. However, a coupling method of the ferrite core 330** may not be limited.

In one embodiment, when the working coil 31 is supplied with high-frequency power, a magnetic field may be generated around the ferrite core 330, and when an object to be heated is placed in or about an area in which the magnetic field is generated, an eddy current may be generated and may cause Joule heat to heat the object.

Figure 9:
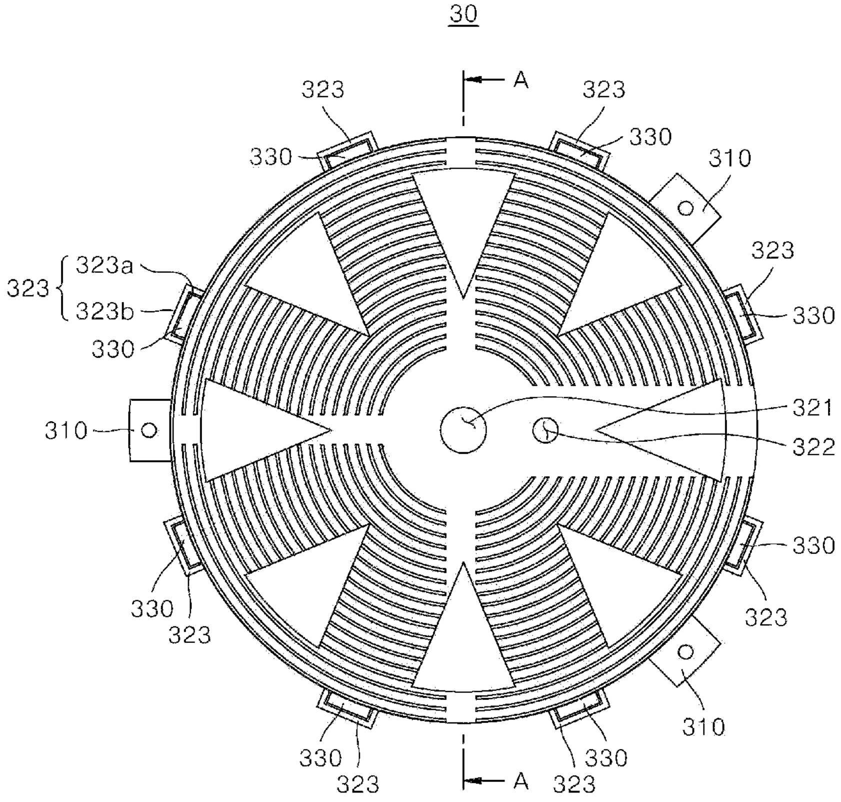
FIG. 9 is a plan view showing an example heating part according to an embodiment of the present disclosure.
Figure 10:
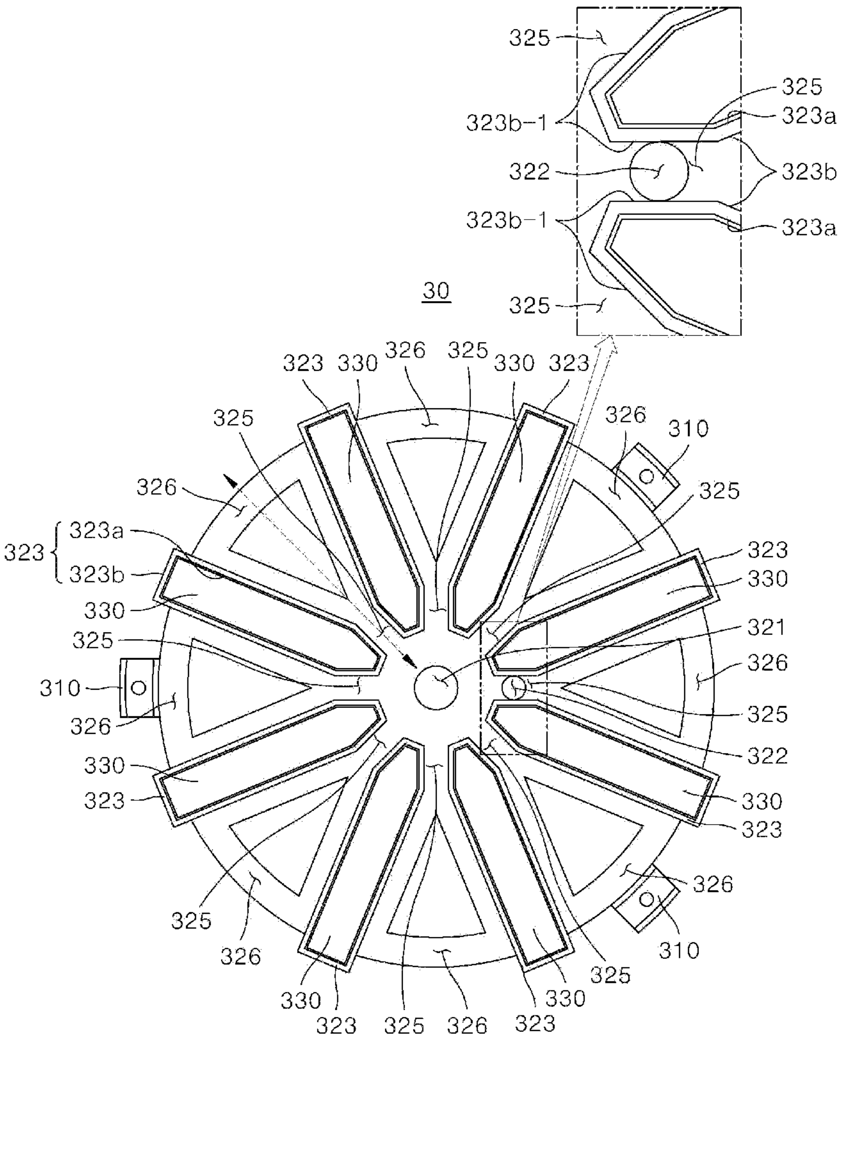
FIG. 10 is a bottom view showing an example heating part according to an embodiment of the present disclosure.
Figure 11:
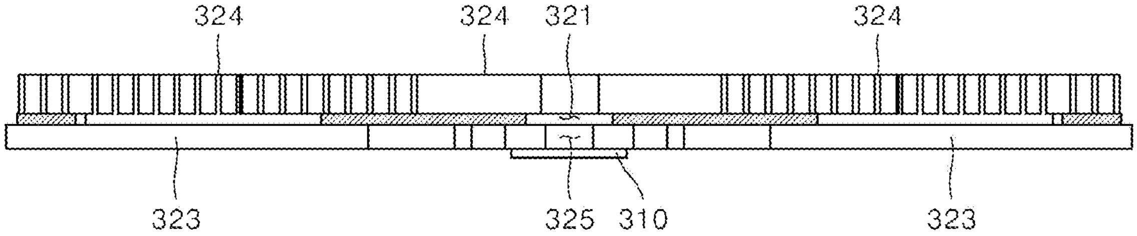
FIG. 11 is a cross-sectional view according to an embodiment of FIG. 9 illustrated in an AA direction.

FIG. 9 is a plan view showing the heating part 30 in one embodiment of the present disclosure. FIG. 10 is a bottom view showing the heating part 30 in one embodiment of the present disclosure. FIG. 11 is a cross-sectional view showing FIG. 9 shown from an AA direction illustrated in FIG. 9.

When the working coil 31 is supplied with power, an electromagnetic field may be generated around the ferrite core 330. Due to an electromagnetic interaction, heat may be generated in the heating part 30. Additionally, heat may be generated around the ferrite core 330 disposed under the heating part 30.

In one example, to cool down the heat generated around the ferrite core 330, an additional passage hole to facilitate convection of air on the first upper plate 41 of the upper bracket 40 disposed under the ferrite core 330, and the air may flow through the passage hole to cool the ferrite core 330 based on the convective heat transfer.

However, when the heated air flows from the heating part 30 to the printed circuit board 51 disposed under the first upper plate 41 through the passage hole, the printed circuit board 51 and the components mounted onto the printed circuit board 51 may be heated, which may cause operational errors and failures of the electric range.

Additionally, an electromagnetic field and electromagnetic waves generated in the heating part 30 may reach the printed circuit board 51 disposed under the first upper plate 41 through the passage hole without being blocked by the first upper plate 41, causing deterioration or reduction of the EMC and EMI performances of the electric range.

In one embodiment, to prevent or reduce the above described effects, air may be directed to flow smoothly or evenly among the plurality of ferrite cores 330, such that the heat generated in the heating part 30 smoothly or evenly cools down over the first upper plate 41 of the upper bracket 40.

Thus, an additional passage hole for cooling may not necessitated on the first upper plate 41, and the first upper plate 41 may have a minimum number of through holes, and a convection-based transfer of the heat generated in the heating part 30 through the through holes to the printed circuit board 51 disposed under the first upper plate 41 may be suppressed or reduced. Additionally, the electromagnetic field and electromagnetic waves transmitted to the printed circuit board 51 may be suppressed or reduced.

Referring to FIG. 10, the core frame 320 may have a plurality of air gaps 325. The plurality of air gaps 325 may be provided or disposed among or between the plurality of channels 323, disposed radially, and may be configure to communicate or direct air flow from the center of the core frame 320 to the edge of the core frame 320.

Each of the air gaps 325 may be formed or disposed among or between a plurality of guide lines **232*b* forming mounting grooves 323*a* onto which the ferrite core 330 disposed under the core frame 320 may be mounted, in the circumferential direction of the core frame 320**.

Each of the air gaps 325 may be formed in a way or manner that the guide lines **323*b* may be spaced from one another radially at or about the central portion of the core frame 320**.

The guide line **323*b* may have a chamfering part 323*b*-1 configured to reduce the width of a front portion of the guide line 323*b* at or about the central portion of the core frame 320. In this example, the front denotes a direction toward the center of the core frame 320**.

The air gaps 325 may be formed in a way or manner that the chamfering parts **323*b*-1 adjacent to one another may be spaced apart from one another in the circumferential direction of the core frame 320. Accordingly, The plurality of air gaps 325 may be disposed at or about the central portion of the core frame 320 at regular intervals in the circumferential direction of the core frame 320**.

Each of the air gaps 325 may be surrounded by an outer lateral surface of the chamfering part **323*b*-1 of the guide line 323*b* and by a bottom surface of the core frame 320, at or about the central portion of the core frame 320**, such that a front portion, a rear portion, and a lower portion may be open.

The core frame 320 may have an open hole 326 at or about a position of the edge thereof, facing the air gap 325. The open hole 326 may be formed in a way or manner that the adjacent guide lines **323*b* may be spaced apart from one another in the circumferential direction of the core frame 320**.

The open hole 326 may be surrounded by an outer lateral surface of another portion of the guide line **323*b* other than the chamfering part 232*b*-1 of the guide line 323*b* and by the bottom surface of the core frame 320** such that a front portion, a rear portion, and a lower portion may be open.

The air gap 325 and the open hole 326 may be disposed to face each other in the diameter or radial direction of the core frame 320. Accordingly, air may flow smoothly or evenly from the center of the core frame 320 to the edge thereof, in a lower or bottom side portion of the core frame 320 in the diameter direction of the core frame 320 along the air gap 325 and the open hole 326.

For example, heated air in the central portion of the core frame 320 may move or flow to the edge of the core frame 320 along the air gap 325 and the open hole 326 such that the core frame 320 readily or quickly cools.

Additionally, in one embodiment, the plurality of air gaps 325 and the plurality of open holes 326 may be radially and symmetrically disposed with respect to the center of the core frame 320. Accordingly, air at the edge of the core frame 320 may sequentially pass or flow through an open hole 326, an air gap 325, the opposite open hole 326, and the opposite air gap 325 to smoothly or evenly flow to the opposite edge.

In one example, air may flow smoothly or evenly in the diameter direction of the core frame 320 through the air gap 325 and the open hole 326, and below the core frame 320. Accordingly, heated air may easily escape out of the core frame 320, while cool air may easily come or flow into the central portion of the core frame 320 from outside of the core frame 320. Thus, an additional passage hole for cooling may not be formed or necessitated on the first upper plate 41 of the upper bracket 40.

Since an additional passage hole is not formed or needed as described above, the heat generated in the heating part 30 may be suppressed or reduced from transferring or flowing through from the passage hole to the printed circuit board 51 disposed under the first upper plate 41 through the passage hole.

Additionally, since an additional passage hole is not formed or needed, an electromagnetic field and electromagnetic waves generated in the heating part 30 may be suppressed or reduced from transmitting through from the passage to the printed circuit board 51 disposed under the upper bracket 40, thereby ensuring improvement in the EMC and EMI of the electric range.

The air gap 325 and the open hole 326 may have a radial and symmetrical structure, and the ferrite core 330 may also be provided radially and symmetrically with respect to the center of the core frame 320. Accordingly, each ferrite core 330 and the working coil 31 disposed near or about the ferrite core 330, in the symmetrical disposition corresponding to the plurality of ferrite cores 330, may generate a more uniform magnetic field in the circumferential direction of the core frame 320 compared to an asymmetrical disposition corresponding to the plurality of ferrite cores 330.

The second inserting hole 431 may be formed or disposed in or about a portion of the upper bracket 40, corresponding to the edge portion of the core frame 320. Referring to FIG. 7, the second inserting hole 431 into which the working coil 31, inserted from the printed circuit board 51 into the core frame 320, may be inserted. The second inserting hole 431 may be formed or disposed in or about a portion of the first upper plate 41, corresponding to the edge of the core frame 320.

Thus, when the second inserting hole 431 may be formed in or about a portion of the first upper plate 41 corresponding to the central portion of the core frame 320, the heat generated in the heating part 30 may be suppressed or reduced from transferring or flowing to the printed circuit board 51 disposed under the first upper plate 41.

That is, less heat may transfer from the heating part 30 to the printed circuit board 51 through the second inserting hole 431 when the second inserting hole 431 may be disposed at or about the edge of the core frame 320 than when the second inserting hole 431 may be disposed in or about the central portion of the core frame 320.

Accordingly, the third inserting hole 432 may be formed in or about a portion of the upper bracket 40, corresponding to the edge portion of the core frame 320. Referring to FIG. 7, the third inserting hole 432 may be formed in or about a position of the first upper plate 41 corresponding to the edge of the core frame 320.

The first inserting hole 322 may be formed in or about a portion of the core frame 320, where the air gap 25 may be formed, and the working coil 31 mounted onto the core frame 320 may be inserted into the first inserting hole 322.

In this example, the working coil 31 having passed through the second inserting hole 431 and inserted into an upper or top side of the first upper plate 41 may reach the first inserting hole 322 disposed in about the portion where the air gap 325 may be formed. Further, the working coil 31 may pass through the open hole 326 and the air gap 325 formed in the lower or bottom portion of the core frame 320. The working coil 31 may also pass through the first inserting hole 322, and may be wound around the guide rail 324 formed on the core frame 320. Thus, the air gap 325 and the open hole 326 may serve as a passage in which the working coil 31 may be disposed.

In one embodiment, since the working coil 31 may be disposed in the air gap 325 and the open hole 326, the second inserting hole 431 may be disposed at or about the edge of the core frame 320. Thus, the second inserting hole 431 at or about the edge of the core frame 320 may help reduce the amount of heat transferred or flowing from the heating part 30 to the printed circuit board 51, compared to the second inserting hole 431 disposed in the central portion of the core frame 320.

The cable inserting hole 420 may be formed or disposed in or about a portion of the upper bracket 40 corresponding to the edge portion of the core frame 320. Referring to FIG. 7, the cable inserting hole 420 may be formed or disposed on the first upper plate 41 in or about the portion corresponding to the edge portion of the core frame 320.

A cable connected to the temperature sensor 60 may pass through the air gap 325 and the open hole 326. The cable may also pass through the cable inserting hole 420 at the edge of the core frame 320 and may be inserted into the printed circuit board 51 disposed under the first upper plate 41. That is, the air gap 325 and the open hole 326 may serve as a passage through which the cable of the temperature sensor 60 may be disposed.

In one embodiment, the cable may be disposed in or about the air gap 325 and the open hole 326. Thus, the cable inserting hole 420 may be disposed at or about the edge of the core frame 320. Accordingly, as described in reference to the second inserting hole 431 above, less heat may transfer or flow from the heating part 30 to the printed circuit board 51 through the cable inserting hole 420 at the edge of the core frame 320 than compared to the cable inserting hole 420 in the central portion of the core frame 320.

The surface area of the air gap 325 on the core frame 320 may be greater than the cross section of the first inserting hole 322. In the example, the working coil 31 inserted into the first inserting hole 322 may be disposed reliably in the air gap 325 without being interrupted by the guide line 323*b*.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

What is claimed is:

1. An electric range, comprising:

a case;

a cover plate coupled to an upper surface of the case;

a plurality of heating parts disposed under the cover plate;

a plurality of upper brackets disposed under the plurality of heating parts;

a base bracket disposed under the plurality of upper brackets;

a printed circuit board disposed on the base bracket, wherein each of the plurality of heating parts comprises:

a core frame comprising a plurality of channels disposed radially on a lower surface of the core frame; and a plurality of ferrite cores disposed on the plurality of channels and under the core frame, wherein the core frame comprises a plurality of air gaps respectively disposed between the plurality of channels, and wherein the plurality of air gaps are disposed radially from a center of the core frame to an edge of the core frame, wherein each of the plurality of channels comprises a guide line protruding from the lower surface of the core frame, wherein the guide line comprises a chamfering part that reduces a width of a front portion of the guide line adjacent the central portion of the core frame, and wherein the air gap is formed in a way that the chamfering parts adjacent to one another are spaced from one another in a circumferential direction of the core frame.

2. The electric range of claim 1, wherein each of the plurality of channels comprises:

a mounting groove onto which at least one of the plurality of ferrite cores is mounted; and wherein the air gaps are disposed between each of the plurality of channels and extend from a central portion of the core frame.

3. The electric range of claim 2, wherein the core frame comprises a first inserting hole disposed at a portion where at least one of the plurality of air gaps is formed to receive a working coil that is attached to the core frame.

4. The electric range of claim 3, wherein the core frame further comprises:

a guide rail having a spiral shape and disposed on the upper surface of the core frame to guide the working coil; and a plurality of second coupling parts protruding from an outer circumference of the core frame, wherein the plurality of second coupling parts are disposed radially, and wherein the plurality of second coupling parts are coupled to a plurality of first coupling parts disposed on the plurality of upper brackets.

5. The electric range of claim 3, wherein the core frame comprises a mounting hole on which a temperature sensor is mounted, wherein the at least one of the plurality of upper brackets comprises a cable inserting hole to receive a cable of the temperature sensor.

6. The electric range of claim 5, wherein the at least one of the plurality of upper brackets comprises a second inserting hole into which the working coil inserted into the core frame is inserted, and a third inserting hole into which the working coil withdrawn from the core frame is inserted.

7. The electric range of claim 6, wherein the second inserting hole and the third inserting hole are disposed about a portion of the at least one of the upper brackets corresponding to an edge portion of the core frame.

8. The electric range of claim 5, wherein the electric range further comprises a sensor bracket, wherein the temperature sensor is disposed on the sensor bracket, and wherein the temperature sensor is detachably mounted on the mounting hole.

9. The electric range of claim 5, wherein the cable inserting hole is disposed about a portion of the at least one of the plurality of upper brackets corresponding to an edge portion of the core frame.

10. The electric range of claim 3 wherein a surface area of each of the plurality of the plurality of air gaps, is greater than a cross section of the first inserting hole.

11. The electric range of claim 2, wherein the core frame comprises an open hole disposed about an edge portion of the core frame, wherein the open hole faces the at least one of the plurality of air gaps.

12. The electric range of claim 2, wherein the guide line comprises a plurality of guide lines, each of the plurality of guide lines being spaced apart from one another in a circumferential direction of the core frame.

13. The electric range of claim 1, wherein the plurality of air gaps are disposed at the central portion of the core frame at regular intervals in the circumferential direction of the core frame.

14. The electric range of claim 1, wherein each of the air gaps is surrounded by an outer lateral surface of the chamfering part of the guide line and by a bottom surface of the core frame, at the central portion of the core frame, such that a front portion, a rear portion, and a lower portion are opened.

15. An electric range, comprising:

a case;

a cover plate coupled to an upper surface of the case;

a plurality of heating parts disposed under the cover plate;

a core frame comprising a plurality of channels disposed radially on a lower surface of the core frame;

a plurality of ferrite cores disposed on the plurality of channels and under the core frame; and a plurality of upper brackets disposed under the plurality of heating parts;

wherein the core frame comprises a plurality of air gaps respectively disposed between the plurality of channels, wherein the plurality of air gaps are disposed radially from a center of the core frame to an edge of the core frame, wherein each of the plurality of channels comprises a guide line protruding from the lower surface of the core frame, wherein the guide line comprises a chamfering part that reduces a width of a front portion of the guide line adjacent the central portion of the core frame, and wherein the air gap is formed in a way that the chamfering parts adjacent to one another are spaced from one another in a circumferential direction of the core frame.

16. The electric range of claim 15, wherein each of the plurality of channels comprises:

a mounting groove onto which one of the plurality of ferrite cores is mounted; and wherein the air gaps are disposed between each of the plurality of channels and extend from a central portion of the core frame, wherein the core frame comprises a first inserting hole into which a working coil that is attached to the core frame is inserted, the first inserting hole disposed at a portion of the core frame where at least one of the plurality of air gaps is disposed.

17. The electric range of claim 16, wherein the core frame comprises a mounting hole, wherein a temperature sensor is mounted about a central portion of the core frame, wherein at least one of the plurality of upper brackets comprises a second inserting hole, wherein a cable of the temperature sensor is inserted into a cable inserting hole, wherein the working coil is inserted into a third inserting hole and the core frame, and wherein the working coil is withdrawn from the core frame and inserted into a fourth inserting hole.

18. The electric range of claim 17, wherein the core frame comprises an open hole about an edge portion of the core frame, and wherein the open hole faces the at least one of the plurality of air gaps.

19. The electric range of claim 16, wherein the guide line comprises a plurality of guide lines, each of the plurality of guide lines being spaced apart from one another in a circumferential direction of the core frame.

* * * * *